Sept. 15, 1953　　　W. G. BEATTY　　　2,652,025
DEMOUNTABLE ANIMAL PEN ASSEMBLY
Filed Dec. 20, 1950　　　　　　　　　　2 Sheets-Sheet 1
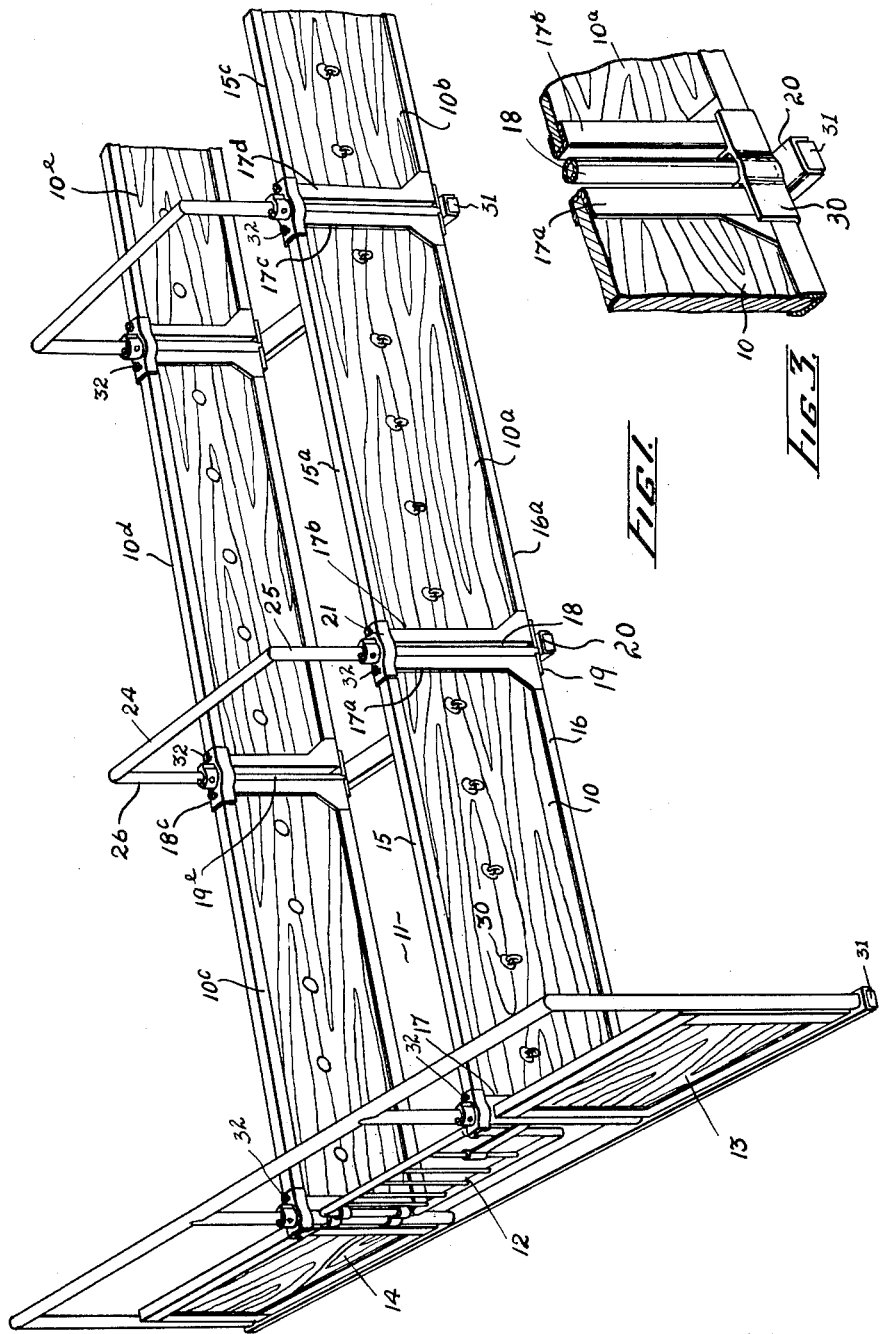
INVENTOR
WILLIAM GEORGE BEATTY
PER
ATTORNEY.

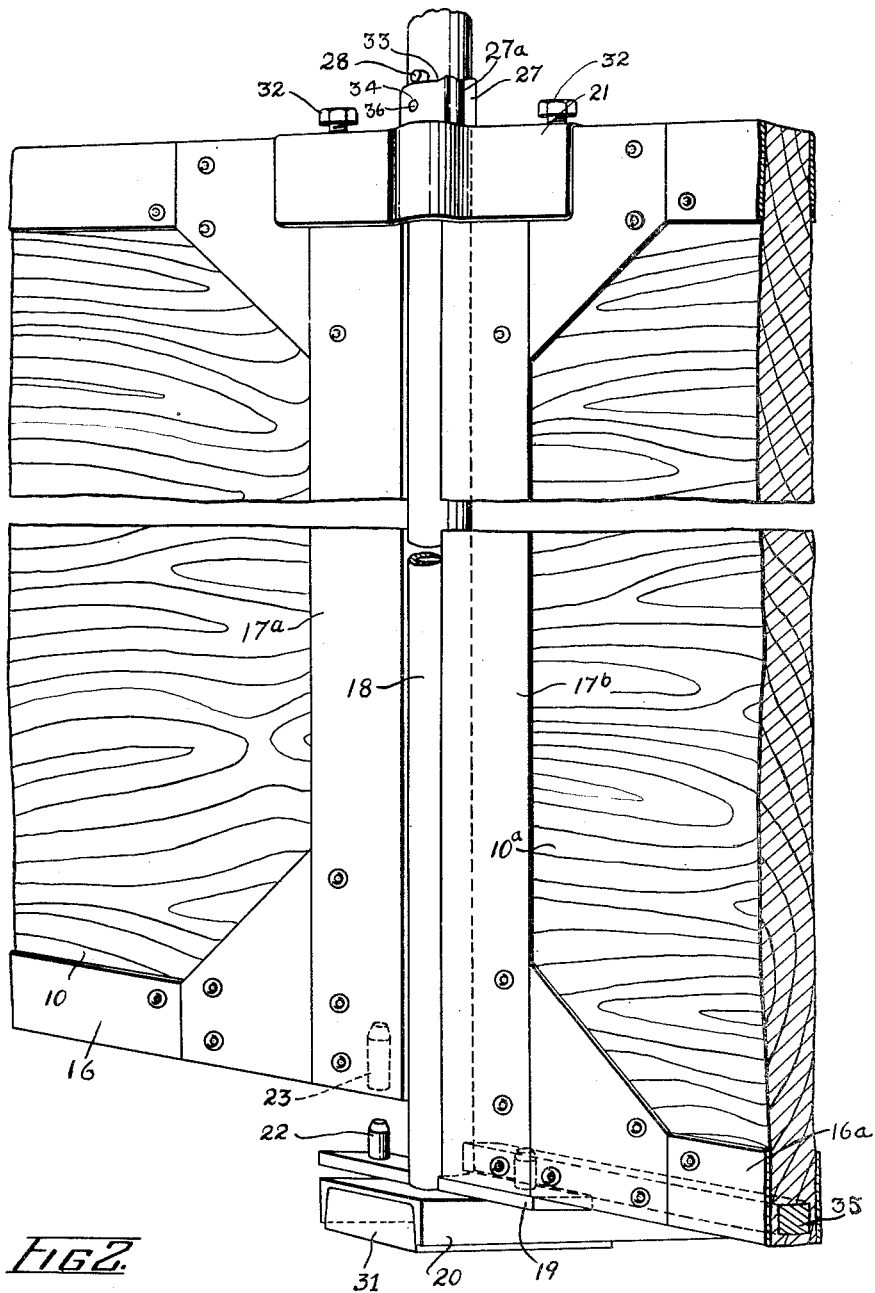

Patented Sept. 15, 1953

2,652,025

UNITED STATES PATENT OFFICE 2,652,025

DEMOUNTABLE ANIMAL PEN ASSEMBLY

William George Beatty, Fergus, Ontario, Canada, assignor to Beatty Bros. Limited, Fergus, Ontario, Canada, a corporation of Canada Application December 20, 1950, Serial No. 201,749
In Canada September 7, 1950

13 Claims. (Cl. 119—27)

This invention relates to a sectional pen structure for confining animals and is particularly directed to providing a structure which may be readily assembled in a desired location and easily and quickly disassembled when not in use.

An important object of this invention is to provide an improved sectional panel structure for tethering cattle and other animals.

A further important object of the invention is to provide an improved connector for sectional stall and stable structures to and from which end or side panels may be readily attached and detached, and when in operative position, holds the panels firmly and securely in place.

A still further object of the invention is to provide a sectional animal tethering structure which is self-supporting and when in assembled position is firm and capable of withstanding the stresses and strains to which it is subjected, and to which sections may be readily added or detached to adapt the structure to the building in which it is to be used and to the number of animals to be tethered.

The animal pen or stall structure of the present invention comprises, in general, a vertical upright positioned between the opposing ends of two adjacent panel sections, an inverted U-shaped member carried by said upright and adapted to embrace a portion of the upper rim of each opposing end of each panel member, releasable means carried by said upright for securing said U-shaped member firmly in place, a sill at the lower end of said upright adapted to support a portion of each opposing lower ends of the panels, and releasable means for attaching the opposing ends of the panels to the adjacent portions of said sill.

An understanding of the manner in which the above and other objects may be attained may be had from the following description, reference being made to the accompanying drawing, in which:

Figure 1 is a sectional cattle stall embodying the improvements of the present invention; and Figure 2 is a front elevation, on an enlarged scale, illustrating portions of two adjacent panel sections joined to a common vertical intermediate post.

Figure 3 is a fragmentary view, on an enlarged scale, showing an alternative means for supporting the lower ends of the panels to that shown in Fig. 2.

Like reference numerals refer to like parts throughout the specification and drawing.

Referring to the drawing the numerals 10, 10a, 10b, 10c, 10d, and 10e indicate panels adapted for use in tethering, for example, cattle or hogs in a stable, the panels 10, 10a and 10b being parallel to and spaced from the panels 10c, 10d and 10e to provide an aisle 11. Entrance to the aisle is gained through a gate 12 carried by and extended between the end panels 13—14.

The panels are substantially the same in construction as is the manner in which the ends are connected to the adjacent uprights. Consequently, only those parts are described in detail as are necessary for an understanding of the invention. The bottom edge of each panel is grooved to receive a reinforcing insert 35.

Each panel is formed, for example, of wood or metal and comprises an upper rail member 15—15a and a lower rail member 16—16a which extends horizontally from end to end of the respective panels. These horizontal members extend between and are secured to the vertical members 17, 17a and 17b and 17c and 17d respectively. These horizontal and vertical members are preferably U-shaped channels into which the edge portions of the panels fit snugly and securely. Tethering rings 30 are spaced along the panels at intervals for tying animals thereto.

The end of each panel is connected to and carried by one of an end post, a corner post or an intermediate post. In each instance the principle of the connection is the same but departures may be made to satisfy specific requirements. For the purpose of description, an intermediate vertical post 18 is described in detail and detailed references are made to the different arrangement of parts employed in the corner and end posts.

The intermediate post 18 is provided, at its base with a plate 19 which extends transversely of the member a short distance in each direction. This plate 19 is adapted to rest on a channel 20 forming a sill. This channel 20 extends transversely of the assembly and also provides a seat for the immediately opposite vertical post 19e. The channel 20 is provided at each end with rubber feet 31 or other similar friction device which will resist movement of the channel by stresses exerted by animals tethered to the panels.

The lower edge of each opposing end of the panels 10—10a is adapted to rest on and to be supported by the adjacent end of the sill 19 such that the vertical members 17a—17b substantially abut the opposite sides of the post 18.

The upper edges of the opposing ends of the panels 10—10a are received in snug fitting relation within the adjacent arms of the elongated channel formed by the inverted U-shaped member 21. This elongated, inverted U-shaped member is secured to or otherwise supported by and embraces the vertical post 18 at a height such that the upper ends of the panels fit snugly into it. The member 18c corresponds to the member 21 and connects the panels 10c and 10d to the upright 19e.

The inverted, U-shaped channel member is securely held in its operative position by a rotatable sleeve 27 of progressively increasing height from its narrowest to its greatest height to provide a cam 33 on the upper edge of the sleeve. The sleeve is mounted on the post and held in a clamping position against the member 21 by a pin 28 inserted into an opening in the post 18 immediately above the combined height of the panel section, channel member and sleeve. With the pin 28 in its locking position, and the sleeve rotated to cause the pin to bear against the cam 33, the channel member is firmly clamped over the upper rims of the opposing end portions of the adjacent panel sections. The sleeve is perforated at 34 to register with a corresponding perforation in the post 18 through which a pin 36 is driven to retain the sleeve against rotation when in its clamping position. This arrangement of parts is disclosed in my prior copending application, now Patent Number 2,610,830, issued September 16, 1952. The channel member 21 may be released from its clamping position by rotating the sleeve in the opposite direction until its narrowest point is engaged against the pin in which position the pin will align with a vertical channel 27a in the inside wall of the sleeve allowing the sleeve to be raised vertically on the upright out of engagement with the clamping member. This allows the channel member 21 to be moved vertically and thus removed from engagement with the panels.

The lower edges of the panels are held against inadvertent displacement from the plate 19, such as by a pin 22 which extends upwardly from the plate 19 at a point between the post 18 and each end of the plate. Each pin 22 is designed to fit into an aligned passageway 23 formed in the adjacent end of the vertical member 17a or 17b. The panels are thus held firmly in place against vertical or lateral displacement from their fixed position and the weight of the structure is sufficient to withstand the stresses and strains to which it is subjected in use. In place of the plate 19, a U-shaped channel 30, illustrated in Fig. 3, may be used. This channel 30 is similar to the channel 21.

Sometimes there may be variations in the height of the panels. In order to provide for this variation each member 21, and each corresponding member, is provided with a pair of adjusting screws 32, one at each end. By turning the screws, differences in the height of adjoining ends may be taken care of.

Transverse reinforcing members 24 are secured to extensions 25 and 26 which extend upwardly from oppositely positioned vertical posts.

The transverse reinforcing members are sufficiently high above the floor to permit a person to walk below them and are designed to reinforce the vertical posts against lateral displacement.

The corner posts embody the plate and inverted U-shaped channel members with the difference that instead of extending at an angle of 180° across the vertical post, the two arms of each member are positioned at an angle of 90° to each other in the directions of the panels.

The present invention possesses a number of important advantages. The invention is particularly applicable to the assembly of animal pens and stalls which are erected for temporary use, such as in arenas and other types of community centers wherein livestock exhibitions are for a limited period of time and the building is employed for other purposes at other times. The various parts are interchangeable and the structure may be assembled and disassembled readily and is capable of being stored in a relatively small space. When erected, it is very stable and is capable of withstanding the stresses and strains to which it is subjected by the tethered animals.

It will be understood, of course, that modifications may be made in the preferred embodiment of the invention described and illustrated herein without departing from the scope of the invention defined by the appended claims.

What I desire to protect by Letters Patent of the United States is:

1. A portable animal pen comprising a plurality of panel sections, a vertically disposed upright positioned between the contiguous ends of each pair of adjacent panel sections, a sill at the lower end of and connected to each upright supporting said upright against displacement by the movement of animals tied thereto, a plate carried by said sill and projecting outwardly from opposite sides of the base of the upright and at right angles to the sill, said plate forming a support for the contiguous ends of each pair of adjacent panel sections, a pin projecting upwardly from the plate on opposite sides of the upright, a hole in the lower edge of each panel adjacent to said upright for receiving said pin, a detachable member carried by each upright and adapted to engage the upper edge of the adjacent ends of each pair of panel sections to hold said sections in fixed position and releasable means securing said member firmly in fixed position.

2. A portable animal pen according to claim 1 in which said releasable means comprises a sleeve rotatably mounted on said upright and engaging with said detachable member, said sleeve having a cam-like surface on the upper edge of said sleeve, a pin through said upright and positioned to act on said cam-like surface to urge said sleeve when rotated in one direction to its locking position, and to release said sleeve when rotated in the opposite direction.

3. In a portable animal pen having a plurality of panel sections arranged to be connected into a unitary structure having spaced apart longitudinal walls with an alleyway therebetween, means for connecting contiguous panel sections together and for interconnecting oppositely disposed panel sections comprising a transverse member, an upright member at each end of said member, a cross bar connecting the upper ends of the upright members, a plate extending outwardly from opposite sides of the base of each post, said plate forming a support for the ends of each pair of adjacent panel sections, releasable means for securing each of said lower ends on said plate against lateral displacement, a detachable member carried by each upright and adapted to engage the upper edge of the adjacent ends of each pair of panel sections and releasable means securing said member firmly in place.

4. In a portable animal pen having a plurality of panel sections arranged to be connected into a unitary structure having spaced apart longitudinal walls with an alleyway therebetween, means for connecting contiguous panel sections together and for interconnecting oppositely disposed panel sections comprising a transverse channel member, an upright member at each end of said member, a cross bar connecting the upper ends of the upright members, a plate extending outwardly from opposite sides of the base of the post at right angles to the channel, said plate forming a support for ends of each pair of adjacent panel sections and having an upright stud at each end thereof to enter a recess in the lower edge of the panel section which rests on said plate, a detachable member carried by each upright and adapted to engage the upper edge of the adjacent ends of each pair of panel sections and releasable means securing said member firmly in place.

5. A portable animal pen comprising a plurality of panel sections arranged to be connected into a unitary structure, a vertically disposed upright positioned between the opposing ends of each pair of adjacent panel sections, a sill at the lower end of and connected to each upright and arranged to support said upright against displacement by the movement of animals tied thereto, said sill forming a support for the ends of each pair of adjacent panel sections, means for removably attaching each of said lower ends to said sill against lateral displacement relative thereto, a detachable member carried by each upright and adapted to engage the upper edge of the adjacent ends of each pair of panel sections, releasable means securing said member firmly in place, and means carried by said member for adjusting said member to allow for differences in height between adjacent ends of adjoining panels.

6. An animal pen structure which comprises a vertically disposed upright positioned between the contiguous ends of adjacent panel sections, a sill at the lower end of said upright adapted to support a portion of the lower edge of each adjacent panel section, releasable means for attaching each of said lower ends on said sill against lateral displacement consisting of a plate attached to said sill, said plate having a portion which engages with the lower end of each adjacent panel section, an inverted U-shaped member carried by said upright and adapted to embrace a portion of the upper rim of each adjacent end of each panel member, and releasable means carried by said upright for securing said inverted U-shaped member firmly in place.

7. A portable animal pen according to claim 6 in which said sill is provided on the underside thereof with an anti-slip device.

8. For a sectional animal pen having at least two panel sections and vertically disposed upright positioned between the contiguous ends of adjacent panel sections, cooperating members removably locking adjacent sections together to form an animal pen, one member comprising a lower horizontally projecting support member on the lower end of the upright to support contiguous ends of adjacent panel sections and having a part engaging with the said ends to retain the panel sections against lateral or longitudinal movement, and the other member comprising an upper removable member having a central orifice therethrough, said channel member being mountable on and receiving the upper edges of contiguous ends of adjacent panel sections with the upright extending through said orifice, a sleeve rotatably and removably mounted on said upright and having its lower edge supported on said channel member, and its upper edge formed with a cam-like surface, a fixed member on said upright positioned to be engaged by the cam-like surface to cause the sleeve to apply a clamping pressure to the contiguous ends of the panel sections when the sleeve is rotated in one direction to lock said contiguous ends together and to unlock said ends when the sleeve is rotated in the opposite direction.

9. For a sectional animal pen having at least two panel sections and a vertically disposed upright positioned between the contiguous ends of adjacent panel sections, cooperating members removably locking adjacent sections together to form an animal pen, one member comprising a lower support member on the lower end of the upright and extending radially from opposite sides thereof to support contiguous ends of adjacent panel sections and having a part engaging with the bottom edges of said ends to retain the panel sections against lateral or longitudinal movement, and the other member comprising an upper channel member having a central orifice for entering the upright therethrough, said channel member receiving the upper edges of contiguous ends of adjacent sections with the upright extending through said orifice, a sleeve rotatably and removably mounted on said upright to be supported on said channel member, a cam-like surface on the upper edge of said sleeve, a fixed member on said upright positioned to engage against said surface to apply a clamping pressure to said channel when rotated in one direction, and a vertical channel in said sleeve positioned to register with said fixed member when said sleeve is rotated in a direction to release said pressure.

10. For a sectional animal pen as claimed in claim 8 in which the upper member is provided with a pair of adjusting screws, one on each side of the upright.

11. For a sectional animal pen as claimed in claim 9 in which the part on the lower member engaging with the lower edges consists of an upstanding stud at each end of the lower support member and the bottom edge of each section is formed with a recess for receiving one of said studs.

12. For a sectional animal pen as claimed in claim 8 in which the part on the lower member engaging with the lower edges consists of an upstanding stud at each end of the lower support member and the bottom edge of each section is formed with a recess for receiving one of said studs.

13. An animal pen structure which comprises a vertically disposed upright positioned between the contiguous ends of adjacent panel sections, a sill at the lower end of said upright adapted to support a portion of the lower edge of each adjacent panel section, releasable means for attaching each of said lower ends on said sill against lateral displacement, an inverted U-shaped member carried by said upright and adapted to embrace a portion of the upper rim of each adjacent end of each panel member, and releasable means carried by said upright for securing said inverted U-shaped member firmly in place, comprising a sleeve rotatably mounted on said upright and engaging with said detachable member, said sleeve having a cam-like surface on the upper edge of said sleeve, a pin through said upright and positioned to act on said cam-like surface to urge said sleeve when rotated in one direction to its locking position, and to release said sleeve when rotated in the opposite direction.

WILLIAM GEORGE BEATTY.

References Cited in the file of this patent

UNITED STATES PATENTS

| Number | Name | Date |
|---|---|---|
| 116,989 | Pearson | July 11, 1871 |
| 261,281 | Van Dorn | July 18, 1882 |
| 638,434 | Woodman | Dec. 5, 1899 |
| 1,147,409 | Krawczyk | July 20, 1915 |
| 2,331,390 | Gustafson | Oct. 12, 1943 |
| 2,610,830 | Beatty | Sept. 16, 1952 |